Nov. 1, 1960 H. G. LAUTERBACH 2,958,113

NEEDLED BATT

Filed Feb. 21, 1955 3 Sheets-Sheet 1

INVENTOR
HERBERT G. LAUTERBACH

BY Carl A. Hechmer

ATTORNEY

INVENTOR
HERBERT G. LAUTERBACH
BY Carl A. Hechmer
ATTORNEY

Nov. 1, 1960 H. G. LAUTERBACH 2,958,113

NEEDLED BATT

Filed Feb. 21, 1955 3 Sheets-Sheet 3

INVENTOR
HERBERT G. LAUTERBACH

BY Raymond E. Blomstedt
ATTORNEY

United States Patent Office 2,958,113
Patented Nov. 1, 1960

2,958,113

NEEDLED BATT

Herbert G. Lauterbach, Wilmington, Del., assignor to E. I. du Pont de Nemours and Company, Wilmington, Del., a corporation of Delaware Filed Feb. 21, 1955, Ser. No. 489,492

1 Claim. (Cl. 28—79)

This invention relates to an article of commerce and a process for its preparation. More particularly it relates to a novel, non-woven, self-ligated batt prepared by the ligation needling of a loose batt of fiber.

By the term "ligation needling" is meant the binding together of adjacently disposed batt fiber lying substantially parallel to the faces of the batt by forcibly orienting sufficient fiber to a position substantially perpendicular to the ultimate faces of the product that a unitary, coherent, self-ligated product is formed, the perpendicular fiber orientation being accomplished by subjecting the loose fiber batt to recurrent piercing and withdrawal of a "rasping-profile" needle as described hereinafter.

By a "rasping-profile" is meant that an elevational view of the needle discloses at least one abrupt, hookless break, i.e., a notch or a protuberance having a substantially smooth surface, in the continuity of its edge. By "abrupt" is meant that the extent of the profile discontinuity along the longitudinal axis of the needle is no more than about five or six times the extent of its discontinuity normal to the said longitudinal axis. By a "hookless break" is meant a discontinuity of such shape that as the tangent to the discontinuity is progressed in either direction from the point wherein it is parallel to the longitudinal axis of the needle, it will never change more than about 90° in direction. This needle is described and claimed in copending U.S. application Serial No. 427,465, filed May 4, 1954, now U.S. Patent No. 2,857,650, in the name of Herbert G. Lauterbach, of which the present application is a continuation-in-part.

It is an object of the present invention to provide a novel and useful self-ligated batt.

Another object is to provide a process for the preparation of a self-ligated batt by ligation needling.

These and other objects will become apparent in the course of the following specification and claim.

The details of the present invention will be more readily understood by reference to the following drawings and description.

Figure 1 is an illustration of a commercially available barbed needle;

Figure 1*a* is a fragmentary view of the blade of the needle of Figure 1 exemplifying various dimensions;

Figure 2 is an illustration of a rasping-profile needle of the present invention prepared from the needle of Figure 1;

Figure 2*a* is a fragmentary view of the blade of the needle of Figure 2 exemplifying various dimensions;

Figure 5:
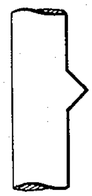
Figure 6:
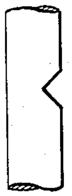
Figure 7:
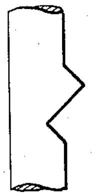
Figure 8:
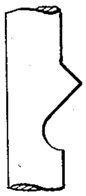
Figure 9:
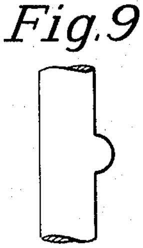
Figure 10:
Figure 11:
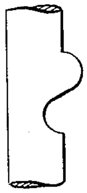
Figure 12:
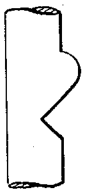
Figure 13:
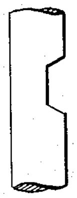
Figure 14:
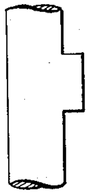
Figure 15:
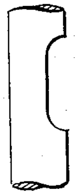
Figure 16:
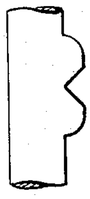
Figure 17:
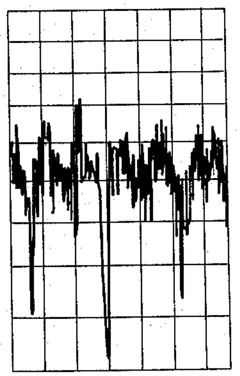
Figure 18:
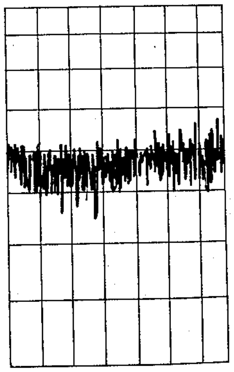
Figure 19:
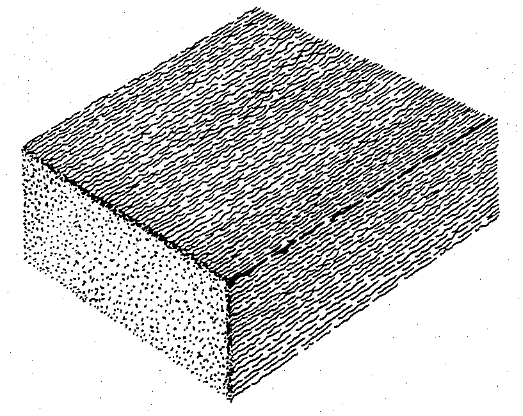

Figures 5 to 16 inclusive are fragmentary elevations of a rasping-profile needle illustrating variations in the nature of the profile discontinuity within the definition of an abrupt, hookless break;

Figure 5 is a fragmentary elevation of a rasping-profile needle wherein the abrupt, hookless break is a sharp protuberance;

Figure 6 shows a needle profile containing a sharp notch;

Figure 7 illustrates a combination of a sharp notch and a sharp protuberance;

Figure 8 exemplifies a sharp protuberance and a rounded notch;

Figure 9 is a needle profile containing a rounded protuberance;

Figure 10 is a needle profile wherein the notch is rounded;

Figure 11 is a view of a needle profile with a combination of a rounded protuberance and a rounded notch;

Figure 12 shows a needle combining a rounded protuberance and a sharp notch;

Figure 13 is a view of a long sharp notch in a needle profile;

Figure 14 illustrates a long sharp protuberance in a needle profile;

Figure 15 exemplifies a needle having a long rounded notch;

Figure 16 is a view of a rasping-profile needle wherein a rounded protuberance containing a sharp notch provides profile discontinuity;

Figure 17 is a reproduction of the curve produced on a display cathode oscilliscope responsive to a light source moved over the surface of a batt needled with a barbed needle of the prior art;

Figure 18 is a reproduction of the curve produced on a display cathode oscilliscope responsive to a light source moved over the surface of a ligated batt produced by ligation needling as taught in the present application;

Figure 19 shows a self-ligated batt of this invention.

Figure 1:
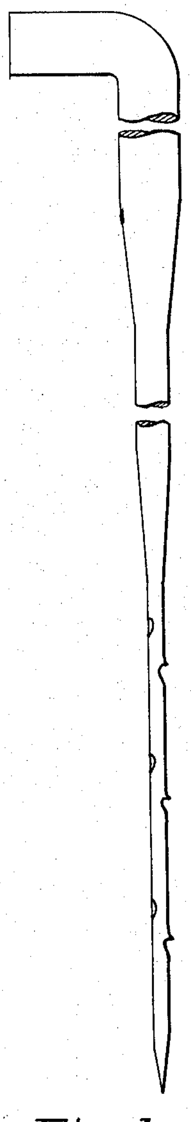
Figure 3:
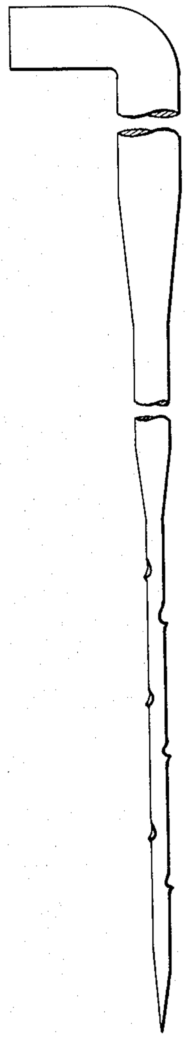
Figure 3 shows a needle containing barbs in a reverse direction to those upon the needle of Figure 1.

The barbed needle of the prior art, which is not suitable for ligation needling as taught in the present application, is illustrated in Figure 1. It will be apparent from the drawing that as the tangent to the notch (i.e., the tangent at the apex of the notch angle) is progressed from a point where it is parallel to the longitudinal axis of the needle, around the discontinuity toward the anchoring end of the needle, it describes an angle of substantially more than 90°. Note also that progression of the tangent from the tip of the protuberance where it is parallel to the longitudinal axis toward the needle point causes an angle substantially greater than 90° to be described. This irregularity is in the form of a hook. Neither this needle nor that of Figure 3, therefore, is within the definition of a rasping-profile needle.

Figure 2:
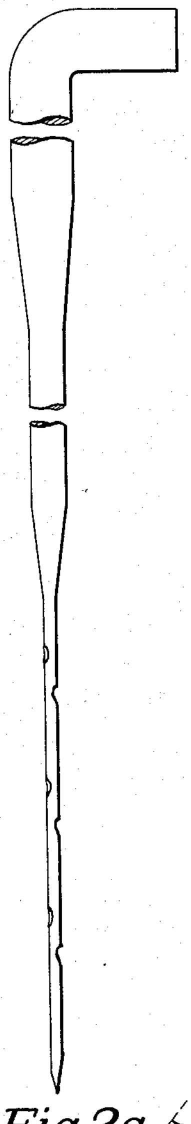
Figure 4:
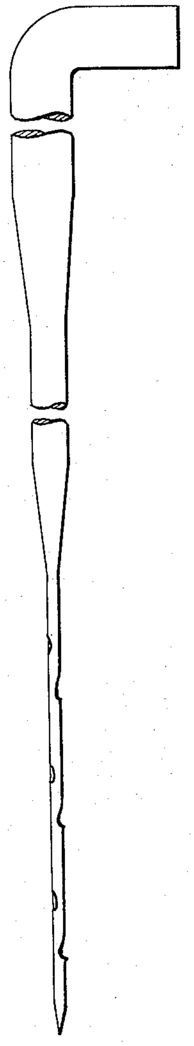
Figure 4 illustrates a rasping-profile needle prepared from the barbed needle of Figure 3.

Figures 2 and 4 each illustrate a rasping-profile needle. The break in continuity is abrupt and hookless. Figures 5 to 16 inclusive illustrate various suitable profile continuity breaks within the definition of a rasping-profile.

Figure 1A:
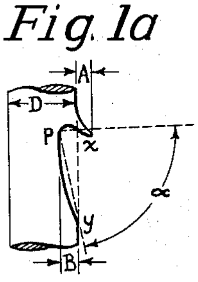
Figure 2A:
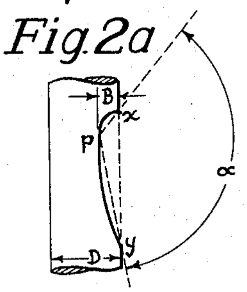

The following examples are cited to illustrate the invention. They are not intended to limit it in any manner. The barbed needles of Examples 3 and 8 were obtained from the Textile Machine Works of Reading, Pennsylvania. The other barbed needles of Examples 1 to 10 inclusive were acquired from the Torrington Company of Torrington, Connecticut. Each of the barbed needles have triangular cross-sections along their blades. In the system of needle designation the figures represent the following dimensions:

Butt×middle section×blade×overall length. The unit of length is inches. All other dimensions are in terms of wire gauge. The blade gauge is determined before triangulation. The effective cross-sectional dimension (indicated as "D") reported for comparison purposes, is the measurement of the maximum thickness of blade cross-section in inches representing the average of several micrometer measurements at points of apparent maximum thickness including protuberances where present. The dimension "A" is the maximum variation in inches measured perpendicularly from the continuous profile due to a protuberance. The dimension "B" is the maximum variation in inches measured perpendicularly from the continuous profile due to a notch. The angle "α" is the angle subtended by the lines drawn from the upper and lower points of profile continuity to the deepest point within the notch. These dimensions are illustrated in Figures 1*a* and 2*a*.

In each example, 1125 needles were suspended point down with only the blades submerged in 4400 cc. of C.P. reagent 37% hydrochloric acid (in water). This is about 4 cc. of acid per needle. A glass tray serves to hold the acid. Unless otherwise noted, fresh acid is substituted about every 2⅓ hours. In each case the solutions are at room temperature and unagitated. The blades are spaced sufficiently to avoid contact with one another. After etching the needles are rinsed with water to remove acid and thereafter dried.

TABLE II

| Sample | Batt Weight (oz./sq. yd.) | | Tensile Strength (p.s.i.) | | Elongation (percent) | |
|---|---|---|---|---|---|---|
| | Before Needling | After Needling | Warp | Filling | Warp | Filling |
| 1 | 15 | 4.9 | 28.8 | 12.0 | 79.2 | 81.4 |
| 2 | 10 | 7.3 | 72.2 | 74.2 | 112.1 | 82.4 |

A striking improvement in the properties of the ligation-needled product (Sample No. 2) over those of the product needled in accordance with the prior art (Sample No. 1) results, although the loose batt of Sample No. 1 is much heavier (3 plies) than that of Sample No. 2 (2 plies).

*Example 12*

Two identical non-woven loose batts are prepared by carding and cross-lapping 2.5 inch polyethylene terephthalate staple, 3 denier per filament fiber. Sample 3 is needled in the needle loom described above, the loom being equipped with the needle illustrated in Figure 1, having the dimensions 15 x 18 x 2 x 5 x 3½. This sample is passed through the loom a total of four times, alternating two times on each side. The batt is observed to spread considerably and to be pocked with needle marks. It is placed between a light source moving in a four-inch line and pulsed at 60 cycles per second and a photocell which feeds its pulsed input into a display cathode ray oscilloscope. The projection of the oscilloscope represents the varying intensity of light as it passes through the batt along its determined path. The projection of the cathode ray oscilloscope is reproduced in Figure 17. The top peaks represent areas of no light transmission through the batt. The bottom peaks denote light transmission through the batt. The non-uniform nature of the batt will be apparent from the wide fluctuations, particularly in the bottom peaks and the wide spread between top and bottom peaks.

Sample 4 is a ligation needled in the loom described above, the loom being equipped with the rasping-profile needle produced in Example 1. This sample is passed through the loom a total of four times, alternating two times on each side. The ligated batt produced is observed to be uniform, only slightly spread and lacking in visible needle marks. The result of the light transmission density observation for Sample 4 (made as described for Sample 3) is reproduced as Figure 18. The relatively uniform fluctuations between top and bottom peaks demonstrates the uniform nature of the product. The relatively narrow spread between top and bottom peaks indicates the high covering power of the product produced by the process of the present invention.

The process of ligation needling may be applied to a non-woven batt of any textile funicular structure, i.e., fiber, filament, staple, yarn or the like, whether natural or synthetic. Among suitable natureal material may be

TABLE I

| Ex. | Needle | Before Etching | | | | Etching Time (Hrs.) | After Etching | | | |
|---|---|---|---|---|---|---|---|---|---|---|
| | | A | B | D | α, degrees | | A | B | D | α, degrees |
| 1 | 15 x 18 x 25 x 3½ (Reg. Barb) | .0048 | .0076 | .039 | 66 | 7 | 0 | .0067 | .026 | 142 |
| 2 | Same as 1 | .0048 | .0076 | .039 | 66 | 14 | 0 | .0025 | .012 | 154 |
| 3 | 15 x 18 x 25 x 3½ (Reverse Barb) | .0038 | .0076 | .039 | 85 | 10 | 0 | .0038 | .021 | 135 |
| 4 | 15 x 18 x 25 x 3½ (Close Barb) | .0048 | .0076 | .040 | 77 | 7 | 0 | .0076 | .025 | 136 |
| 5 | 15 x 17 x 19 x 3½ (Reg. Barb) | .0057 | .0115 | .050 | 74 | 7 | 0 | .0103 | .032 | 128 |
| 6 | 15 x 17 x 19 x 3½ (Close Barb) | .0065 | .0126 | .056 | 63 | 7 | .0019 | .0115 | .043 | 93 |
| 7 | 15 x 18 x 30 x 3½ (Reg. Barb) | .0048 | .0067 | .032 | 84 | 7 | 0 | .0057 | .023 | 121 |
| 8 | 15 x 18 x 30 x 3½ (Reg. Barb) | 0 | .0038 | .012 | 65 | 7 | 0 | .0038 | .007 | 104 |
| 9 | 15 x 18 x 25 x 3 (Reg. Barb) | .0038 | .0076 | .037 | 71 | 7 | .0015 | .0067 | .022 | 126 |
| 10 | Same as 1 | .0048 | .0076 | .039 | 66 | 4½ | 0 | .0072 | .028 | 133 |

Rasping-profile needles prepared as described above are particularly valuable in the production of a coherent, non-woven, self-ligated product from a loose batt of a fibrous mass. This process is illustrated in Examples 11 and 12 which follow. In each example about 1400 needles are mounted on the needle boards of a 36 inch James Hunter Machine Company needle-loom. The loom runs at 250 revolutions per minute. The feed advances while the needles are drawn clear of it at the rate of 0.285 inch per needle oscillation. The properties reported are determined according to A.S.T.M. Designation D461-53.

*Example 11*

Two identical non-woven loose batts of approximately 5 ounces per square yard are prepared by carding and cross-lapping 3 inch polyacrylonitrile staple fiber having a denier per filament of 3. Three layers are plied to form Sample No. 1. This sample is then needled in the needle loom described above, the loom being equipped with the needle illustrated in Figure 1, having the dimensions 15 x 18 x 20 x 3½. The sample is passed through the loom a total of ten times, alternating five times on each side. The properties of the product are reported in Table II below.

Sample No. 2 is prepared by plying two layers of the 5 ounce loose batt previously described. This batt is ligation needled in accordance with the process of the present invention, i.e., adjacently disposed batt fiber lying substantially parallel to the faces of the loose batt is forcibly oriented by means of recurrent piercing and withdrawal of a rasping-profile needle, as previously described, to a position substantially perpendicular to the ultimate faces of the product resulting in an interlocking to produce a self-ligated batt. In this procedure the loom is equipped with the rasping-profile needle as prepared in Example 1. This sample is also passed through the loom a total of ten times, alternating five times on each side. Properties of the ligated batt are reported in Table II.

mentioned cotton, flax, jute, silk, wool and the like. Where the funicular structure is man-made it may be oriented or unoriented. It may be elastic. The denier may vary from as low as 1 to as high as 100 or above. The length of the single staple fiber may vary from a few millimeters to 10 centimeters or more. Man-made structures amenable to the process include those produced from glass, regenerated cellulose, cellulose derivatives such as cellulose acetate, polycondensation products such as polyamides and polyesters and the polymers obtained by addition polymerization from ethylenically unsaturated low molecular compounds, for instance acrylonitrile, vinylidene chloride, vinyl chloride and copolymers thereof. Furthermore, two or more different fibers may be mixed. The method of forming the batt is not critical. It may be layed from a liquid suspension upon a moving screen. Alternatively, staple, fiber or filament may be blown or dropped upon a surface. The funicular structure may be crimped or uncrimped and of circular or irregular cross-section. With these techniques the use of staple fiber having a length below one inch with a denier per filament from about 1/10 to 6 and produced from a synthetic linear polymer is preferred.

The ligated batt prepared in accordance with the process of the present invention is particularly useful in the preparation of a coherent, non-woven felt-like product when the loose batt which is ligation needled contains a substantial proportion of retractable synthetic filament as described in U.S. application No. 312,067, now abandoned. The production of such products is described in the following examples.

*Example 13*

The needle loom is equipped with the rasping-profile needles prepared as described in Example 1. A quantity of three denier, spontaneously crimpable polyethylene terephthalate filament is prepared by extruding through a spinneret and drawing in an air jet as disclosed in U.S. Patent 2,604,689 to Hebeler. The filaments are cut into 2½ inch staple fibers and without relaxing are carded as in conventional textile operations. A batt thirty inches wide, is formed from the carded layers to a depth of about 3 inches and weighing 3.1 pounds per square yard. The batt is ligation needled by being passed through the needle loom for a total of 20 passes, the batt being turned over after each pass. It receives about 2100 punchings per square inch. During this step the batt area increases about 25%. The ligated batt is then immersed in boiling water for 2 minutes. It shrinks about 50% in area. The felt-like product is dried. It has a final thickness of 0.370 inch and weighs 6.2 pounds per square yard. Its longitudinal tensile strength is 1,580 pounds per square inch while its splitting resistance is 59 pounds per two inch width. The product has a good appearance with but few visible needle marks. It is particularly useful in felt applications where unusual strength is required.

*Example 14*

The needle loom is equipped with the regular barbed needle of Figure 1 having the dimensions 15x18x25x3½. The process of Example 13 is repeated. After the 20 passes the needled batt decreases in density to the point that a felt-like product can no longer be produced on shrinking. The best felt-like product made with these needles is shrunk after two passes through the loom (one pass on each side). It is 0.5 inch thick, weighs 5.9 pounds per square yard, has a tensile strength of 630 pounds per square inch and a splitting resistance of 18 pounds per two inch width. In addition to its relatively poor strength characteristics, this product contains visible needle marks and exhibits tufts of fibers vertically oriented on the surface opposite to that in which the needles are last introduced.

*Example 15*

The needle loom is equipped with the rasping-profile needle of Example 10. A batt of carded layers about 5 inches deep, weighing 4.8 pounds per square yard is formed from seven denier per filament, three inch staple polyethylene terephthalate, prepared as described in Example 13. The batt is ligation needled by feeding it to the loom for a total of five passes, resulting in about 525 needle punchings per square inch. The ligated batt is shrunk 40% in area by passing through a hot air oven at 200° C. for 5 minutes. The felt product weighs eight pounds per square yard. After pressing at 120° C. for two minutes under a pressure of five hundred pounds per square inch, it has an average thickness of 0.340 inch. The average splitting resistance is 21.3 pounds per two inch width. Longitudinal tensile strength is 940 pounds per square inch. The product is dense and contains but few visible needle marks. It is useful as a glass polishing felt.

*Example 16*

The needle loom as equipped in Example 15 is fed the batt of Example 15 for a total of 31 passes (about 3255 punchings per square inch). The ligated batt is shrunk in boiling water as taught previously. It is not pressed. The resulting felt weighs 9.6 pounds per square yard and is 0.50 inch thick. It has a splitting resistance of 68 pounds per two inch width. The longitudinal tensile strength is in excess of 1000 pounds per square inch. This thick felt of high density is useful as a polishing felt.

*Example 17*

The needle loom is equipped with the rasping-profile needles as produced in Example 1. A loose batt of carded layers is formed containing about 75% 3 denier per filament 3 inch staple polyethylene terephthalate fibers and about 25% 6 denier per filament 3 inch staple polyethylene terephthalate fibers. The batt is about 1 inch deep and weighs about 3 ounces per square yard. It is ligated by being passed through the loom 24 times (an average of about 2520 punchings per square inch). It is shrunk 58% by immersion in boiling water for 1 minute. A lightweight felt is formed weighing about 7 ounces per square yard. It has a transverse tensile strength of 600 pounds per square inch, a longitudinal tensile strength of 700 pounds per square inch and a thickness of 0.045 inch. It is suitable for use in skirts and other apparel due to its crease resistance, bending length and liveliness.

The use of the rasping-profile needle as described herein in the preparation of felt-like products in the manner illustrated above permits as much as a ten-fold increase in the number of penetrations per square inch which are possible without weakening the final product than is possible with the barbed needle of the prior art. The increase in penetrations results in a stronger, more uniform and better appearing product. This is believed due to the increased and more homogeneous entanglement of the vertically oriented fibers and the tendency of the rasping-profile needle to grasp single fibers rather than fiber bundles. Thus thinner products of acceptable quality may be formed using the rasping-profile needle than was previously possible. Furthermore, in the production of thick felts, less needle breakage is observed with the needle of the invention as compared with a barbed needle. Not only is there a reduction of needle mark size in the product when the rasping-profile needle is employed, but surface tufts, as was described in Example 14, are eliminated.

The cross-sectional shape of the blade of the rasping-profile needle of the present invention is not critical. The needles exemplified have a blade of triangular cross-section. However, other shapes such as round, flat, elliptical, square, rectangular, hexagonal or the like, may be used. It is preferred, in any case, that the cross-sectional dimension of the blade "D" be maintained at as low a value as possible consonant with strength requirements. Usually a blade having a cross-sectional dimension of about 0.050 inch is satisfactory. For most applications a dimension "D" within the range of about 0.020 to about 0.040 inch is adequate. However, at times a dimension "D" as low as about 0.010 inch is advisable. Since the piercing end of the blade terminates in a point it is obvious that the blade will be tapered at its piercing end. If desired the entire blade section may be so tapered.

The hookless-break which produces the profile discontinuity along the blade of the rasping needle is preferably of the notch variety. While the notch depth, dimension "B" as previously defined, may vary widely, depending upon the properties of the batt fed to the needle loom, a depth within the limits of about 0.002 to about 0.012 inch is generally employed. Usually it is maintained within the limits of about 0.002 and 0.008 inch. Where the profile discontinuity is created by a hookless protuberance, it is preferably no greater than about 0.001 inch whether or not it is in combination with a notch.

The profile discontinuity of the needle blade is disposed substantially horizontally across the blade when the needle is held vertical. Where a notch produces the discontinuity, it is preferred that its angle, i.e., "$\alpha$" as defined previously, be at least 90°, although notches of smaller angles are sometimes operable. A range of notch angle $\alpha$, between about 110° and 160° has been found to produce optimum results in ligation needling as described above under usual operating conditions. Needle properties, such as blade length, number and distribution of profile discontinuities, speed of operation, have not been observed to have any critical effect on the properties of the finished product. The ligating process is affected by such needle variations only to the extent that the number of punchings to attain a desired proportion of fiber substantially perpendicular to the surfaces of the ligated product will vary.

The preferred process for the manufacture of a metal rasping-profile needle comprises etching a needle having a barbed blade by suspending the needle so that its blade is immersed in an acid solution. The etching process tends to remove the "hook" of the barb while usually decreasing the cross-sectional dimension "D," the maximum protuberance "A," the notch depth "B" and the overall length of the blade. The notch angle "$\alpha$" increases. Other general effects of the etching process include a sharpening of the needle point and a sharpening of any edges along the blade length. The usual etching bath is a 37% solution of hydrochloric acid in water. Other acids may be employed in place of the hydrochloric. In the etching procedure, spent acid is preferably replaced with fresh acid at intervals. The period necessary to transform a barbed needle to a rasping-profile needle will depend on many factors such as the etching bath composition, the material of needle construction, the dimensions of the blade of the unetched needle and the like. The period necessary can be approximated by comparing with the period required for a Torrington No. 25 regular barb steel needle etched with the 37% hydrochloric acid using about 4 cc. of acid per needle, replaced at intervals of about 2⅓ hours. This needle, commonly designated as 15 x 18 x 25 x 3½ regular barb is manufactured by the Torrington Company of Torrington, Connecticut. Its overall length is 3½ inches. It has a round sharp point which tapers to an equilateral triangular cross-sectional dimension of 0.039 inch. It contains 9 barbs staggered evenly along the blade about 0.25 inch apart, 3 barbs on an edge. The first and last barbs are 0.25 and 1 inch respectively from the point. The blade (i.e., the working section including the point) is about 1.1 inches in length. The removal of the protruding hook to bring it within the definition of a rasping-profile needle requires a minimum of about 4 hours etching at room temperature. In general, such needles etched for a period of from about 4 to about 16 hours give satisfactory results. Such treatment reduces the cross-sectional dimension "D" about 30 to 40%. The protruding discontinuity (dimension "A") disappears at about 4 hours. The preferred needles are those treated from 6 to 10 hours. Under these conditions the notch angle "$\alpha$" increases to within about 110° to about 160°. The notch depth "B" is within the range of about 0.002 to 0.008 inch. The length of the blade decreases about 3% after etching for 7 hours as described above. The optimum etching period for any particular needle can be approximated by a comparison with the above. More exact figures can be obtained empirically.

The etching process may be modified by the use of agitation, heat, abrasion or the like. For instance, the process may be speeded up by making a thick slurry of abrasive material in acid and rotating the barbed needle in the slurry. A straight edge needle may be given a coating of an acid resistant material which coating is perforated where notches are desired. Rasping-profile needles may be prepared by methods other than etching. The profile discontinuities may be introduced by spot welding, grinding, polishing, firing, sand blasting, swaging, liquid honing, or other mechanical means. The notches may be introduced by striking the needle normal to its longitudinal axis with a sharp instrument, by filing and the like. While metal, specifically steel, is the preferred material of construction, other substances such as glass, ceramic, plastic or the like may likewise be employed. A plastic needle makes production of rasping-profile needles possible by extrusion or injection molding, an extremely fast and inexpensive method.

The ligated batts as described in the present invention are useful in the production of felt-like synthetic products as demonstrated. They are also useful as liners and paddings for suits, coats and other apparel, linings, paddings and stuffings for blankets, upholstery, mattresses, pillows, comforters, sleeping bags and the like, carpets, tissues, cushioning materials, insulation materials, shock absorbents, industrial paddings, filters, sealing materials (e.g. gaskets, liners and stuffings), and medical batts (both orthopedic and surgical). Where the ligated batt contains a substantial proportion of thermoplastic material it is formable into shaped articles by application of heat and pressure.

Many other modifications within the scope of the above invention will be apparent to those skilled in the art without a departure from the inventive concept.

What is claimed is:

A felt-like article comprising a coherent non-woven needled layered batt of synthetic filaments in which portions of individual filaments are oriented uniformly throughout the batt in a position substantially perpendicular to the face of the batt, the batt being free from both needle marking and surface tufts and the filaments being homogeneously entangled throughout the batt.

References Cited in the file of this patent

UNITED STATES PATENTS

| | | |
|---|---|---|
| 1,248,066 | Blocksom | Nov. 27, 1917 |
| 1,314,565 | Billington | Sept. 2, 1919 |
| 1,737,607 | McDermott | Dec. 3, 1929 |
| 1,742,338 | Bettison | Jan. 7, 1930 |
| 2,181,043 | Boeddinghaus | Nov. 21, 1939 |
| 2,232,647 | Zirkman | Feb. 18, 1941 |
| 2,336,797 | Maxwell | Dec. 14, 1943 |
| 2,339,431 | Slayter | Jan. 18, 1944 |
| 2,395,371 | Dockerty | Feb. 19, 1946 |
| 2,437,689 | Francis | Mar. 16, 1948 |
| 2,445,768 | Driver | July 27, 1948 |
| 2,635,322 | McDermott | Apr. 21, 1953 |
| 2,794,238 | Dildilian et al. | June 4, 1957 |